US009185124B2

(12) United States Patent
Chakraborty

(10) Patent No.: US 9,185,124 B2
(45) Date of Patent: Nov. 10, 2015

(54) CYBER DEFENSE SYSTEMS AND METHODS

(71) Applicant: Sayan Chakraborty, Niwot, CO (US)

(72) Inventor: Sayan Chakraborty, Niwot, CO (US)

( * ) Notice: Subject to any disclaimer, the term of this patent is extended or adjusted under 35 U.S.C. 154(b) by 0 days.

(21) Appl. No.: 14/082,131

(22) Filed: Nov. 16, 2013

(65) Prior Publication Data
US 2014/0245443 A1 Aug. 28, 2014

Related U.S. Application Data

(60) Provisional application No. 61/770,068, filed on Feb. 27, 2013.

(51) Int. Cl.
*G06F 11/00* (2006.01)
*G06F 12/14* (2006.01)
*G06F 12/16* (2006.01)
*H04L 29/06* (2006.01)

(52) U.S. Cl.
CPC ......... *H04L 63/1425* (2013.01); *H04L 63/1433* (2013.01)

(58) Field of Classification Search
CPC ....... G06F 21/56; G06F 21/566; G06F 21/55; H04L 63/1416; H04L 63/1408
USPC .......................................................... 726/23
See application file for complete search history.

(56) References Cited

U.S. PATENT DOCUMENTS

| | | | | |
|---|---|---|---|---|
| 6,906,709 B1 * | 6/2005 | Larkin et al. | ................. | 345/419 |
| 7,027,055 B2 * | 4/2006 | Anderson et al. | ............ | 345/473 |
| 7,250,944 B2 * | 7/2007 | Anderson et al. | ............ | 345/419 |
| 2008/0216094 A1 * | 9/2008 | Anderson et al. | ............ | 719/318 |
| 2012/0109610 A1 * | 5/2012 | Anderson et al. | ................. | 703/8 |

* cited by examiner

*Primary Examiner* — Kambiz Zand
*Assistant Examiner* — Stephen Sanders
(74) *Attorney, Agent, or Firm* — Lathrop & Gage LLP

(57) ABSTRACT

Cyber defense systems and methods protect an enterprise system formed of a plurality of networked components. Connectivity and relationship information indicative of connectivity and behavior of the components are collected. A relationship graph is created based upon the connectivity data and the relationship data, wherein nodes of the relationship graph represent the components and edges of the graph represent connectivity and relationships. At least part of the relationship graph is stored to form a chronology. The relationship graph and the chronology are analyzed to predict connectivity and relationship changes within the enterprise system, and a first anomaly is identified when the current connectivity and relationships do not match the prediction.

20 Claims, 9 Drawing Sheets

CYBER DEFENSE SYSTEMS AND METHODS

RELATED APPLICATIONS

This application claims priority to U.S. Patent Application Ser. No. 61/770,068, titled "Cyber Defense Systems and Methods," filed Feb. 27, 2013, and is incorporated herein by reference.

BACKGROUND

Enterprise systems (e.g., a network of computers) utilize a perimeter security approach that relies upon identification of specific patterns associated with malware (e.g. virus signatures). However, modern enterprise systems no longer have easily definable perimeters due to adoption of cloud infrastructure and partnering, wherein part of the enterprise network (e.g., data storage) is hosted by a third party (e.g., data storage warehouses). The rapid evolution of malware threats also outpaces the ability to define and distribute signatures that are used to identify and protect against the malware.

Further, enterprise policy allows bring your own device (BYOD) where an employee brings and uses a personal device at work, which connects to the enterprise network. Thus, devices outside the control of enterprise system policy and protection, if only temporarily, connect to the enterprise network and allow an intruder to compromise the enterprise system. For example, an employee may use a company laptop while away from their desk and connect to the Internet using a public Wi-Fi hotspot, thereby allowing the intruder access to the laptop. When the employee later returns to the office and connects the laptop to the enterprise network, the intruder gains access to the enterprise system from the inside.

Attacks to enterprise systems are often promulgated by "insiders". An employee may be unaware of a compromised device, as the device itself may show no signs of compromise. However, when connected to the enterprise network, the malware on the devices has access to, and may thereby compromise, other components of the enterprise network, particularly since it is connected within the perimeter defenses of the enterprise network.

Most cyberdefense solutions operate at the perimeter of the enterprise network—Firewalls, Virus Scanners, Intrusion Detection Systems all sit between incoming data and the enterprise.

But what if the threat is already in the enterprise? A BYOD smartphone infected at a coffee shop and then connected to the enterprise WiFi network. A laptop infected over Airplane WiFi and then reattached to the enterprise hardwired network. These threats appear to originate within the enterprise and appear to come from valid users.

These perimeter defense systems work by examining the incoming data, looking for signatures that appear to be threats. This leaves them vulnerable to the "zero-day" problem: how do you identify a threat you don't have a signature for yet?

Compliance Enforcement

Numerous regulations govern how an enterprise system must deal with valuable, confidential and/or personal information of their employees or customers. HIPAA, PCI, ISO17799 and other such regulations not only specify privacy requirements and security controls, they also lay out penalties for organizations that fail to comply. Many of these penalties are on a per-incident basis, which can result in thousands of violations as a result of a single breach.

One approach to enforcement of such regulations is to define responsibilities and access for specific employees. These employees are allowed to access protected data, typically with tight restrictions on the specific data they are allowed to access, how much they can access at one time, and where they can access data from—such as only using an encrypted workstation on enterprise premises. These users would be separate from the administrator responsible for the maintenance of the database the protected data is stored in. This separation of responsibilities means that more than one person would be required to modify protected data.

The tools for enforcement of these policies are typically limited in capability and disconnected. Lists of employees, their access rights, and allowed endpoints quickly become out of date as employees leave, arrive, change roles, and upgrade hardware. Expediency often results in employees accumulating greater access than is desirable. An external audit of policy compliance would identify no coherent way to make sure that the stated policies are being adhered to.

SUMMARY OF THE INVENTION

Cyber defense systems and methods described herein provide solutions to the enterprise system security problems described above by harnessing (a) advances in big data acquisition and analysis as well as (b) advances in social network theory. The cyber defense systems and methods are pervasive throughout the enterprise system and/or cloud network and are not just applied at the edge of the enterprise system. The cyber defense systems and methods conduct behavioral analysis that identifies potential anomalies within the enterprise system based upon unexpected behavior defined by expected behavior of grouped peers. That is, where one device of a group of devices determined to have similar behavior starts behaving differently, the anomaly is flagged by the cyber defense systems and methods.

What is needed is a system that is monitoring within the enterprise, and one that does not rely on signatures to discover threats. The cyber defense system is a pervasive, persistent system that is constantly monitoring the behaviors of users and systems within the enterprise, especially where they intersect high value targets (such as datastores).

The cyber defense system assumes that malware will get past perimeter defenses, and is looking for changes in behavior that correspond to an attack already underway. Malware may change its name, its installation method, and the other items that go into identifying it as matching a signature, but it cannot change its behavior and still achieve its purpose. It will infect other systems via propagation that does not match normal business communications. It will access systems it should not, and should extract amounts of data it should not. It will establish abnormal peer-to-peer connections. It will open outbound connections to exfiltrate data, typically to rogue IP addresses. It will disguise or encrypt data transfers to circumvent packet inspectors.

The cyber defense system platform directly addresses this problem by gathering data and then inferring the behavior patterns of users and devices in the system: who is accessing what data, for how long, and from where. The cyber defense system "discovers" normal behavior for a monitored high-risk component (such as a database). When behavior occurs that is outside "normal," alerts may be raised and automatic responses taken. If a user endpoint is extracting volumes of data well beyond what is considered normal for that datastore, alerts can be raised, the connection cut, and the endpoint itself could be disconnected from the external Internet before the data can be forwarded.

As part of the behavior analysis process, the cyber defense system platform is also collecting and analyzing text data from the monitored systems, including items such as database logs, security logs, scripts, and running programs. When an anomaly is discovered that could represent an attack, appropriate text items can be correlated to the event, providing responders with a complete forensic trail at the outset detailing what systems are likely impacted and what the threat vector is.

In one embodiment, a cyber defense method protects an enterprise system formed of a plurality of networked components. Connectivity and relationship information indicative of connectivity and behavior of the components are collected. A relationship graph is created based upon the connectivity data and the relationship data, wherein nodes of the relationship graph represent the components and edges of the graph represent connectivity and relationships. At least part of the relationship graph is stored to form a chronology. The relationship graph and the chronology are analyzed to predict connectivity and relationship changes within the enterprise system, and a first anomaly is identified when the current connectivity and relationships do not match the prediction.

In another embodiment, a cyber defense method protects an enterprise system having a plurality of networked components. Information is received from at least one agent configured to collect the information from the enterprise system. Normative baseline values and abnormal statistical thresholds based upon the information are calculated and relationship graph T is generated based upon updates and changes within the information. Uncertainty is calculated based upon the information and an age of the information. A previously generated predicted relationship graph T and relationship graph T are compared and an anomaly list is generated. The anomaly list is filtered based upon the uncertainty, and alerts are generated based upon the filtered anomaly list.

In another embodiment, a software product has instructions, stored on non-transitory computer-readable media, wherein the instructions, when executed by a computer, perform steps for protecting an enterprise system having a plurality of networked components. The software product includes instructions for collecting connectivity and relationship information indicative of connectivity and behavior of the components; instructions for creating a relationship graph based upon the connectivity data and the relationship data, wherein nodes of the relationship graph represent the components and edges of the graph represent connectivity and relationships; instructions for storing at least part of the relationship graph to form a chronology; instructions for analyzing the relationship graph and the chronology to predict connectivity and relationship changes within the enterprise system; and instructions for identifying a first anomaly when the current connectivity and relationships do not match the prediction.

DETAILED DESCRIPTION OF THE EMBODIMENTS

Definition of Terms

Figure 1:
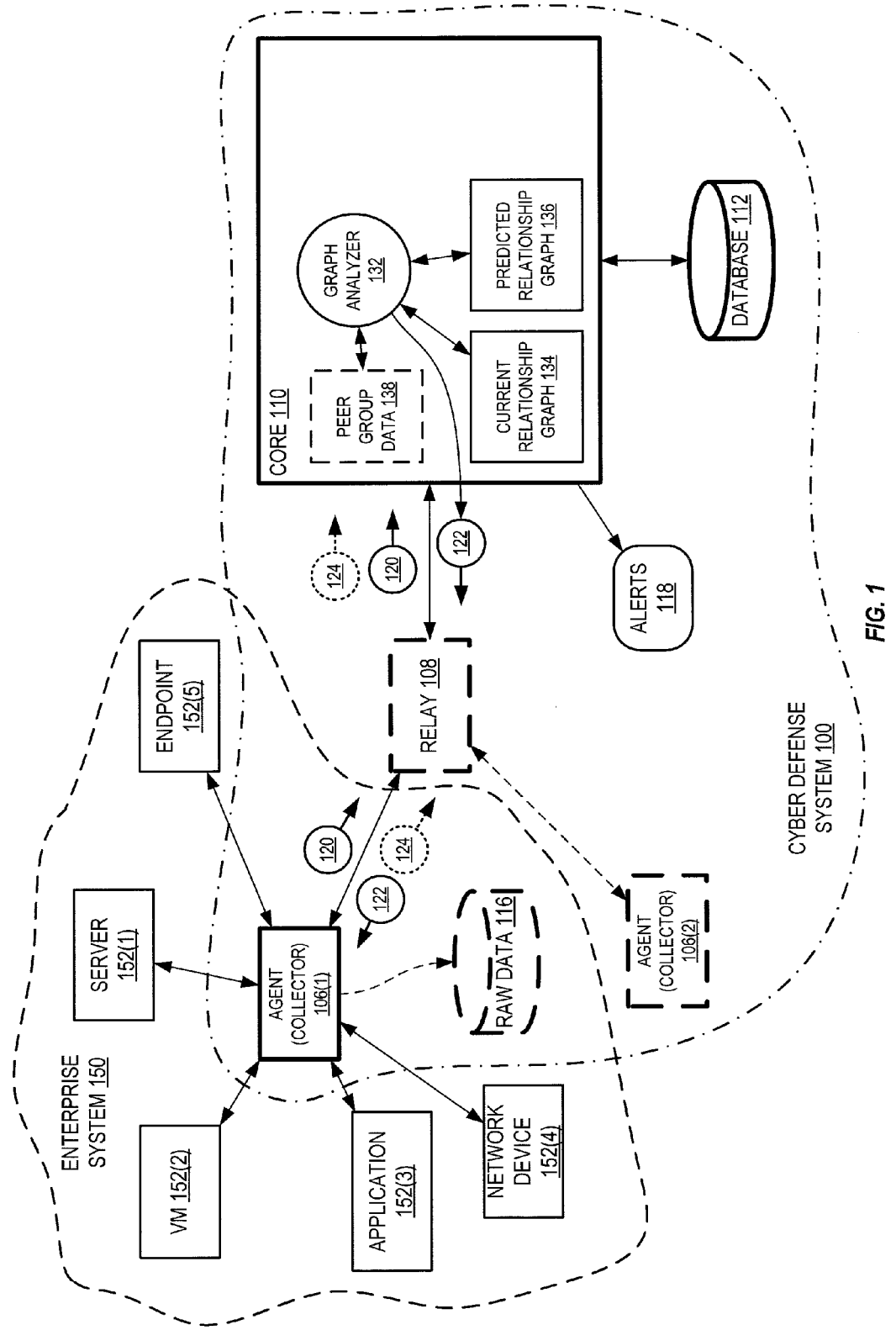
FIG. 1 shows one exemplary cyber defense system configured to protect an enterprise system that includes a plurality of networked components, in an embodiment.

Enterprise System—a collection of networked components.

Components—Parts of the Enterprise system, including: physical devices such as servers, network devices, laptops, mobile devices; virtual devices such as virtual machines (VMs) and software defined network (SDN) devices; applications; databases; CRM systems; and inferred users (as represented by their endpoints).

Connection—a relationship between components. A connection may be a communication path (e.g., a network connection, IP channel, and so on) between two components. When the nodes are applications (such as a CRM system and a Database) the connection could be ODBC or JDBC and so connections need not only be at the protocol layer. Where the component is a VM that supports an application, a container relationship defines a connection between the VM and the application.

Nodes—A relationship graph representation of the components of the enterprise system. Hereinafter, nodes and components may be used interchangeably to denote either or both of the enterprise system components and their representation within a relationship graph.

Edge—A relationship graph representation of the connections of the enterprise system.

Agent—A software program that operates to collect information for the cyber defense system and to detect departure from predictions by the cyber defense system. The agent may be co-resident with one node (e.g., on the same server for example), and/or on a device able to inspect network traffic. The agent may determine relationship information of components from textual data sources (e.g., configuration files).

Uncertainty—the reliability of the quality information due to age and/or paucity of data samples. Uncertainty of the data may be viewed as the age (or freshness) of the data as well as the duration of collection of data that was utilized. For example, the longer the time since new data was collected for a connection with a first component, the higher the uncertainty because the first component may have been removed from the network or a second component added to the network that interacts with the first component. Specifically, prediction accuracy is reduced when the data used to make that prediction is stale. Normal behavior for a component is determined based upon past behavior of that component as well as the past behavior of peers of that component, if available. If the information has a short history, for the component itself and/or for information of its peers, uncertainty for that component is high.

Quality—data about the connection. For example, one or more of: existence of a connection, direction of connection, protocol of connection, ports used, frequency of connection, amount of data transmitted in connection, presence of encrypted traffic on connection, authentication used (if any) for the connection, latency of the connection, error rate of the connection, location of the nodes. Other characteristics may be used for quality without departing from the scope hereof.

Weighting—the significance of the component or connection with respect to the problem being examined (cyber security). Weighting may also be based upon authentication (e.g., authentication of a user on an endpoint).

High Level View

FIG. 1 shows one exemplary cyber defense system 100 configured to protect an enterprise system 150 that includes a plurality of networked components 152. Enterprise system is shown with representative components 152 that include a server 152(1), a virtual machine (VM) 152(2), an application 152(3), a network device 152(4), and an endpoint 152(5). Enterprise system 152 may have any number of these components that are configured to operate together within the enterprise system environment.

Server 152(1) represents a computer that has at least one processor (e.g., core), memory, and input output devices (e.g., network interfaces). VM 152(2) is a software implementation of a machine (i.e. a computer) that executes programs like a physical machine. Virtual machines are separated into two major classifications, based on their use and degree of correspondence to any real machine: a) a system virtual machine provides a complete system platform which supports the execution of a complete operating system (OS); and b) a process virtual machine (also known as a language virtual machine) is designed to run a single program, which means that it supports a single process. Application 152(3) is a software program that is either directly (with or without an operating system) executed by a server (e.g., server 142(1)) or executed within a VM (e.g., VM 152(2)). A network device 152(4) is one of a switch, a router, a software defined networking device (SDND), or other such device that provides communication between components of enterprise system 150. An endpoint 152(5) is one of a laptop computer, a desktop computer, a tablet computer, and a mobile phone that connects to enterprise system 150.

Defense system 100 includes one or more agents 106 that operate to collect information of enterprise system 150. In one embodiment, agents 106 are deployed to run on VMs on dedicated hardware (e.g., a dedicated computer connected with, and optionally located within, enterprise system 150) or on target systems (e.g., computers, servers, switches, endpoints, etc.) of enterprise system 150. Agents 106 may also run as a standalone applications, although deployment with VM is preferred. Agent 106 may also be located external to enterprise system 150, for example running on a VM of a computer that is remote from enterprise system 150 and connected via a network.

Agent 106 operates to collect information periodically, but may vary based on enterprise policy (i.e., it may not be desirable to access some components within enterprise system 150 at a high rate) and the data being collected (i.e., certain types of data changes very rarely). It is certainly possible to detect a change (for example to a configuration file) and do an update on demand, but the data flow architecture of defense system 100 is designed for a regular periodic update.

Agents 106 are responsible for: a) component discovery, b) component fingerprinting, c) data collection, and d) real-time alerting and response. In certain embodiments, data for components within enterprise system 150 may be provided by other products already operating within enterprise system 150. For example, Oracle EMGC, HP OpenView, Sun OpsCenter (as well as products from VMware, Cisco) all do device, VM, and application discovery and monitoring, and may be accessed directly by defense system 100, at least for initial discovery of components within enterprise system 150.

Agent 106 may communicate (e.g., using simple network management protocol (SNMP)) with network device 152(4) to identify servers (e.g., server 152(1), other network devices 152(4), and devices (e.g., endpoint 152(5)) connected thereto. Agent 106 may be co-resident with VM 152(2) or may discover VM 152(2) via a vendor provided VM manager (not shown). Agent 106 may be co-resident with an operating system running on the same server 152(1). Agent 106 may discover application 152(3) via VM 152(2) in which it runs, via server 152(1) on which it runs, or via a management console (e.g. Enterprise Manager Grid Control (EMGC)) (not shown).

Agent 106 sends, via an optional relay 108, collected information 120 to a core 110 that processes and analyzes information 120 and generates predictions 122 that predict changes to connectivity and relationships within enterprise system 150. Upon receiving prediction 122, agent 106, based upon collected connection and relationship information from components 152 of enterprise system 150, identifies potential alerts 124 that are anomalies in detected behavior and connectivity that are not consistent with current connectivity and relationships and that are also not consistent with predictions 122. Agents 106 send potential alerts 124 to core 110 for validation. Core 110 generates alerts 118 that indicate anomalies detected within enterprise system 150. Alerts 118 may be based upon potential alerts 124 generated by agents 106 for example.

Relay 108 is for example included to replay information 120 from a plurality of agents 106 operating within, or connected to, enterprise system 150.

Optionally, agent 106 stores collected information 120 locally within a raw database 116. Collected information 120 stored within database 116 may be later analyzed to provide more details on detected intrusions and alerts 118, for example.

Fingerprinting

Agent 106 may "fingerprint" each component 152 of enterprise system 150 such that each component 152 may be identified in the future. For example, the use of an IP address to identify a particular component may not be appropriate (e.g., where that component is an endpoint that disconnects from one point in the network and reconnects elsewhere in the network) or possible (e.g., an application components is not assigned an IP address). For network devices and servers, however, a static IP address may be sufficient, but other components may not have static IP addresses (e.g. endpoints) or may not be at the IP level at all (applications). A fingerprint of each component allows that component to be recognized, even where an IP address of that component has changed. For example, a fingerprint of an endpoint may include its MAC address, its OS type, a browser, a hardware configuration, and so on, such that even when the IP address and other variable parameters have changed, the device may still be recognized by defense system 100. A fingerprint is for example a series of name:value pairs (such as Bluetooth:None or Bluetooth:4.0) that represent rarely changing aspects of a device.

Connection Data Between Nodes (Edges)

Connection data for components 152 may be available in configuration files on the component setting up the connections. Alternatively, a 'portscan' command may be used to determine connection data. A preferred mechanism uses a 'netstat' query to determine: both incoming and outgoing network connections, routing tables, network interface statistics, and network protocol statistics.

Connection data may include one or more of: existence of a connection, authentication (if any), ports, protocol, direction, encryption, amount of data (e.g., a sustained data rate (Mb/s) over a small sample periods), time and duration of a connection, and time of last data collection. As collection data gets older, the weight of that connection (edge) is reduced and the uncertainty of the connection (edge) increases.

Node Weights and Uncertainties

Node weight indicates the importance of each node within enterprise system 150. In simplest terms, a node is assigned a weight of one (e.g., one hundred percent) when present (e.g., connected to the network) within enterprise system 150, and is assigned a weight of zero (e.g., zero percent) when not present within the enterprise system. A formula may be used to determine node weight when present based upon its value within enterprise system 150 such that detection of anomalous behavior is maximized by focusing on changes in behavior of the node (e.g., sudden change in data rate for important components). Thus, weighting of high-value assets (e.g., keystores, data repositories, content repositories, mail servers, endpoints of senior personnel) of enterprise system 150 is increased such that detection of anomalies is made more sensitive.

If an administrator of defense system 100 indicates that a current alarm is false, then system 100 increases the threshold for triggering that same alarm for the identified nodes and edges. If the alarm is correct, the threshold may be reduced.

Uncertainty is related to the quality and amount of data used to determine an anomaly. Uncertainty of the data may be viewed as the age (or freshness) of the data and the historical length of the data. That is, the greater the duration since new data was collected, the higher the uncertainty, since the component may have been removed from the network or another new component added to the network that interacts with that component. Thus, increased uncertainty reduces prediction accuracy when data used to make the prediction is stale. Normal behavior for a component is determined using past behavior of that component and optionally using past behavior of peers of that component. If there is not a long track record for the component and/or its peers, uncertainty is high.

The time since agent 106 last collected information 120 from each component 152 also defines the node uncertainty. That is, node uncertainty increases as the time since receiving information 120 for that node increases, since anomaly identification becomes less certain as the age of received information 120 increases.

Edge Weights and Uncertainties

Edge uncertainty is calculated based on the time since last data update, and the total number of data samples available to be used in the prediction analysis. Longer time since last update raises uncertainty (modeled as exponential with increasing time), and having fewer data points than needed to make a statistically significant prediction raises uncertainty (modeled as exponential with fewer datapoints from the target value). Overall uncertainty is likely a combination of these two sources normalized to 1.

Example Enterprise System

Figure 2:
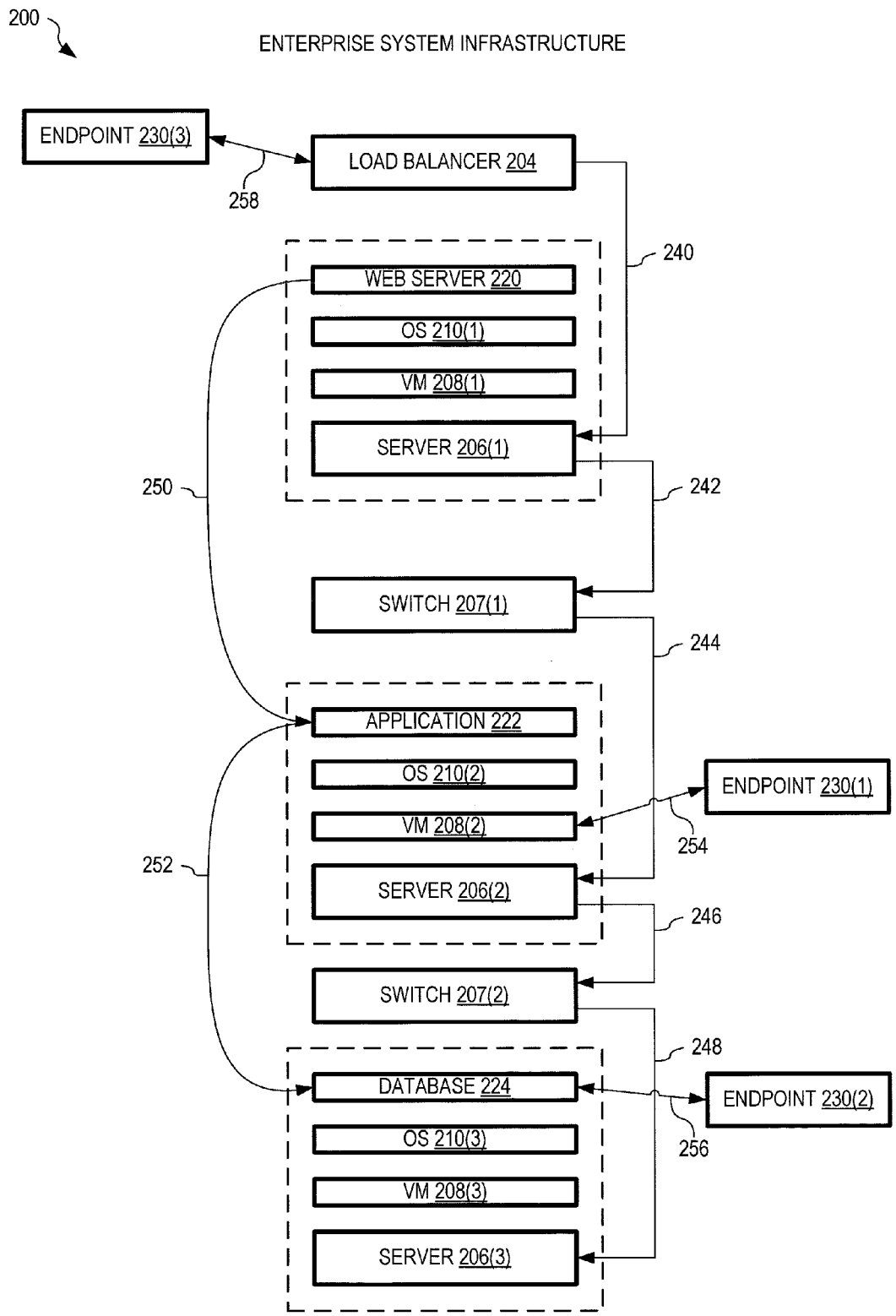
FIG. 2 shows one exemplary prior art enterprise system 200 that includes a load balancer, three servers, and two switches.

FIG. 2 shows one exemplary enterprise system 200 including a load balancer 204, three servers 206(1)-(3), and two switches 207(1)-(2). Enterprise system 200 may represent enterprise system 150 of FIG. 1.

Server 206(1) runs a VM 208(1), on which an operating system (OS) 210(1) runs to support a web server 220. Thus collectively, server 206(1), VM 208(1), OS 210(1) and web server 220 provide a web service within enterprise system 200. Server 206(2) runs a VM 208(2), on which an operating system (OS) 210(2) runs to support an application 222. Thus collectively, server 206(2), VM 208(2), OS 210(2) and application 222 provide an application service within enterprise system 200. Server 206(3) runs a VM 208(3), on which an operating system (OS) 210(3) runs to support a database 224. Thus collectively, server 206(3), VM 208(3), OS 210(3) and database 224 provide a database service within enterprise system 200.

A connection 240 provides communication between load balancer 204 couples and server 206(1). Server 206(1) communicates with switch 297(1) via a connection 242 and switch 207(1) communicates with server 206(2) via a connection 244. Switch 207(1) provides communication between server 206(1) and server 206(2), and switch 207(2) provides communication between server 205(2) and server 206(3). Server 206(2) also communicated with switch 207(2) via a connection 246, and switch 207(2) communicates with server 206(3) via a connection 248. Web server 220 communicates with application 222 via a connection 250, and application 222 communicates with database 224 via a connection 252. Connections 250 and 252 are for example IP channels implemented using connections 242, 244, 246, and 248 for example. This example represents a portion of an enterprise system where switches provide connectivity between a plurality of servers; switches would not be needed for 1:1 communication as shown.

An endpoint 230(1) connects to VM 208(2) via a connection 254 and an endpoint 230(2) connects to database 224 via a connection 256. For example, endpoint 230(1) may represent a workstation of an administrator of VM 208(2), and endpoint 230(2) may represent a workstation of an administrator performing maintenance on database 224. An endpoint 230(3) connects to load balancer 204 via a connection 258 and represents a workstation of a user accessing enterprise system 200. Thus, enterprise system 200 represents a typical three-tier architecture: web, business, database.

Although FIG. 2 shows only web server 220 running on OS 210(1), application 222 running on OS 210(2), and database 224 running on OS 210(3), each OS 210(1)-(3) may support multiple applications without departing from the scope hereof. Similarly, although FIG. 2 shows only OS 210(1) running on VM 208(1), OS 210(2) running on VM 208(2), OS 210(3) running on VM 208(3), each VM 208(1)-(3) may support multiple OSs without departing from the scope hereof. Similarly again, although FIG. 2 shows only VM 208(1) running on server 206(1), VM 208(2) running on server 206(2), VM 208(3) running on server 206(3), each server 206(1)-(3) may support multiple VMs.

Relationship Graph

Figure 3:
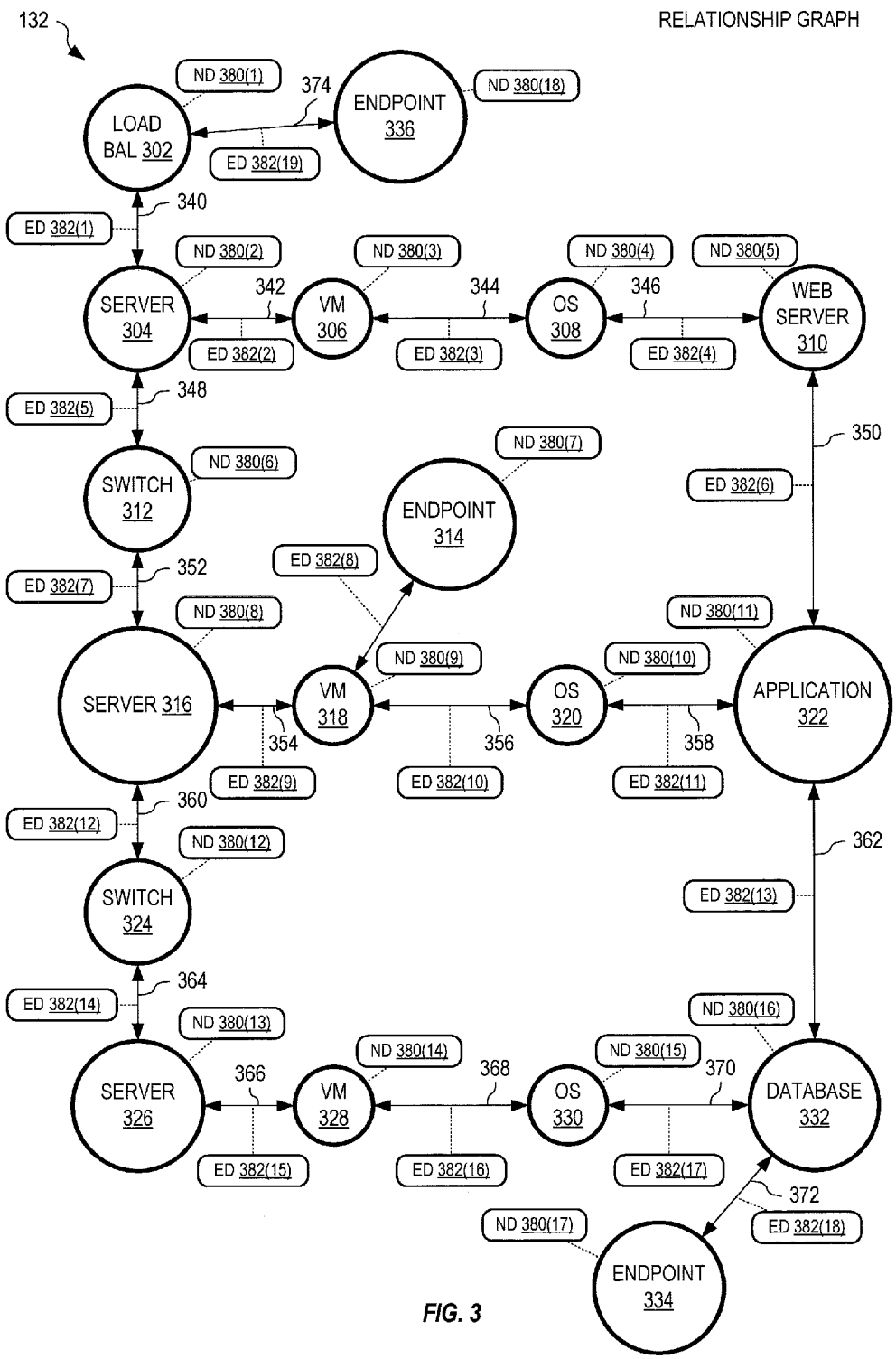
FIG. 3 shows a relationship graph is generated and maintained by the analyzer within the core of the cyber defense system of FIG. 1 and based upon the enterprise system of FIG. 2, in an embodiment.

FIG. 3 shows relationship graph 132 generated and maintained by analyzer 134 within core 110 and based upon collected information 120 of enterprise system 200 of FIG. 2. FIGS. 1 through 3 are best viewed together with the following description. Node 302 represents load balancer 204, node 304 represents server 206(1), node 306 represents VM 206(1), node 308 represents OS 210(1), node 310 represents web server 220, node 312 represents switch 207(1), node 314 represents endpoint 230(1), node 316 represents server 206 (2), node 318 represents VM 208(2), node 310 represents OS 210(2), node 322 represents application 222, node 324 represents switch 207(2), node 326 represents server 206(3), node 328 represents VM 208(3), node 330 represents OS 210(3), node 332 represents database 224, node 334 represents endpoint 230(2), and node 336 represents endpoint 230(3).

Edge 340 connects node 302 to node 204 and represents connection 240. Edge 342 connects node 304 to node 306 and represents an implicit connection between server 206(1) and VM208(1)/OS 210(1). Edge 344 connects node 306 to node 308 and represents an implicit connection between VM208 (1) and OS 210(1). Edge 346 connects node 308 to node 310 and represents an implicit connection between OS 210(1) and web server 220. Edge 348 connects node 304 to node 312 and represents connection 242. Edge 350 connects node 310 to node 322 and represents connection 250. Edge 352 connects node 312 to node 316 and represents connection 244. Edge 354 connects node 316 to node 318 and represents an implicit connection between server 206(2) and VM 208(2). Edge 354 connects node 316 to node 318 and represents an implicit connection between VM 208(2) and OS 210(2). Edge 358 connects node 320 to node 322 and represents an implicit connection between OS 210(2) and application 222. Edge 360 connects node 316 to node 324 and represents connection 246. Edge 362 connects node 322 to node 332 and represents connection 252. Edge 364 connects node 324 to node 326 and represents connection 248. Edge 366 connects node 326 to node 328 and represents an implicit connection between server 206(3) and VM 208(3). Edge 368 connects node 328 to node 320 and represents an implicit connection between VM 208(3) and OS 210(3). Edge 370 connects node 330 to node 332 and represents an implicit connection between OS 210(3) and database 224. Edge 372 connects node 332 to node 334 and represents connection 256. Edge 374 connects node 302 to node 336 and represents connection 258.

Each node 302-336 has associated node data 380(1)-(18), respectively, that defines certain characteristics of each node. For example, node data 380(16) includes characteristics of database 224, such as a weight value that represents an assessment of the value of database 224 to an attacker. Each edge 340-374 has associated edge data 382(1)-(19) that defines characteristics of the connection. For example, edge data 382(13) defines bit rates of connection 252 between application 222 and database 224.

Peer Groups

Optionally, analyzer 134 periodically processes relationship graph 132 to automatically determine peer groups of similar components. For example, a first peer group may include all servers 152(1) within enterprise system 150. A second peer group may include all firewalls within enterprise system 150. A third peer group may include all customer relationship management (CRM) applications within enterprise system 150. A peer group (e.g., firewalls) may be further segmented into peer sub-groups (e.g., Cisco PIX Firewalls may be a peer sub-group within the Firewalls) provided that each peer sub-group remains statistically significant in size.

Analyzer 134 derives and refines peer groups analytically over time by using relationship data within relationship graph 132. For example, if several servers 152(1) are each administered by the same endpoint in the same way and at the same time, analyzer 134 determines that these servers are a peer group, even if they have other differences (such as being from different manufacturers). Peer groups allow behavior (connectivity and relationship) to be predicted for one component of a peer group based upon behavior of the other components in the peer group.

In one embodiment, peer groups may be initially identified by an administrator of system 150. In an alternative environment, peer groups may initially be identified based upon the fingerprint determined for the component. For example, each fingerprint is based upon characteristics of the component that are not likely to change, such as hardware. A hash may then be generated from the fingerprint data, wherein the same hash value indicates the same configuration of component. Where each component has both a salted hash based upon its fingerprint and a non-salted hash based upon its fingerprint, then identical hash values and different salted hash values indicate that they are two unique, but otherwise indistinguishable, components.

Behavior Analysis

Figure 4:
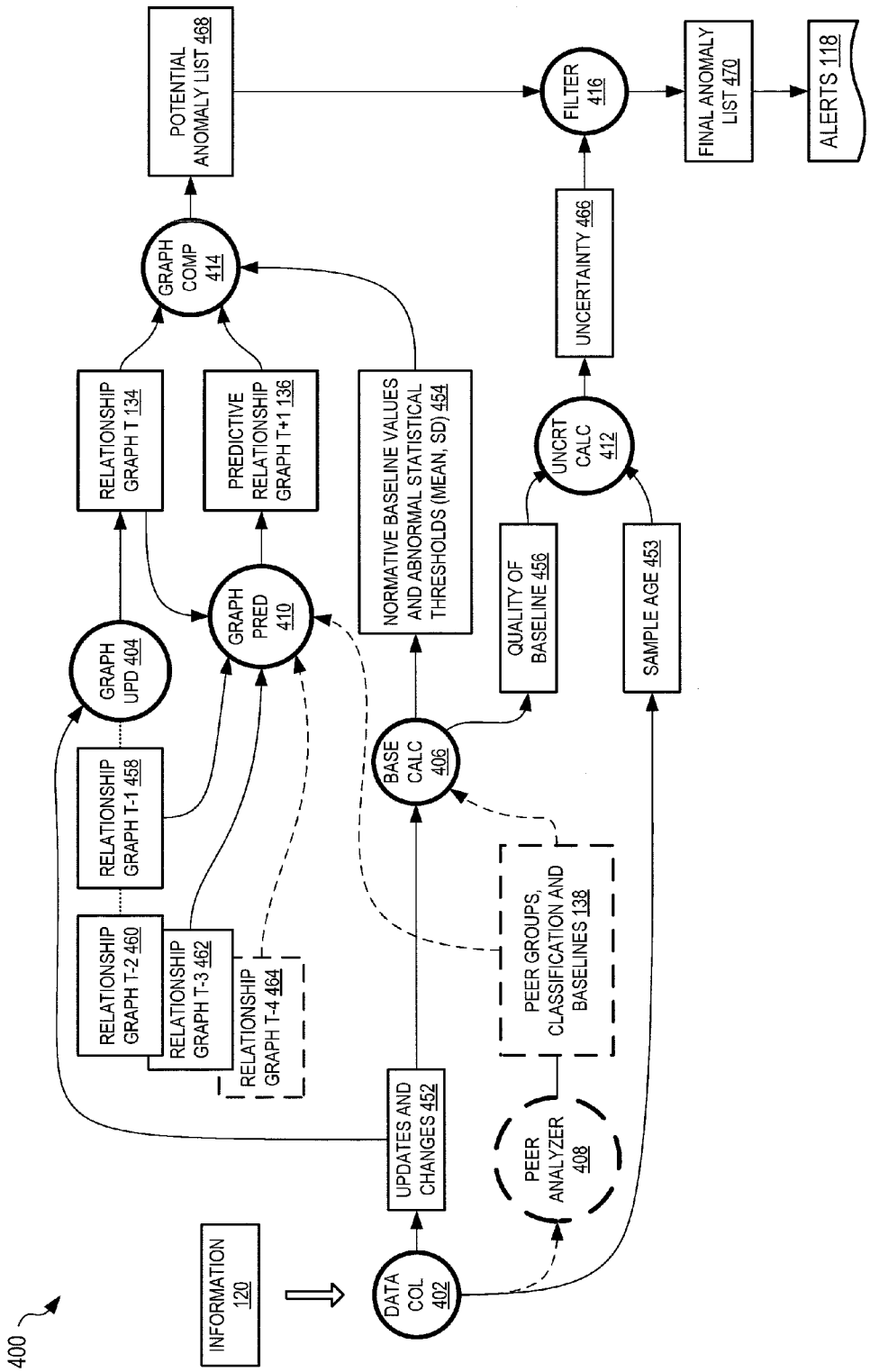
FIG. 4 shows one exemplary data flow schematic illustrating processing functionality and generated data items within the core of the cyber defense system of FIG. 1.
Figure 5:
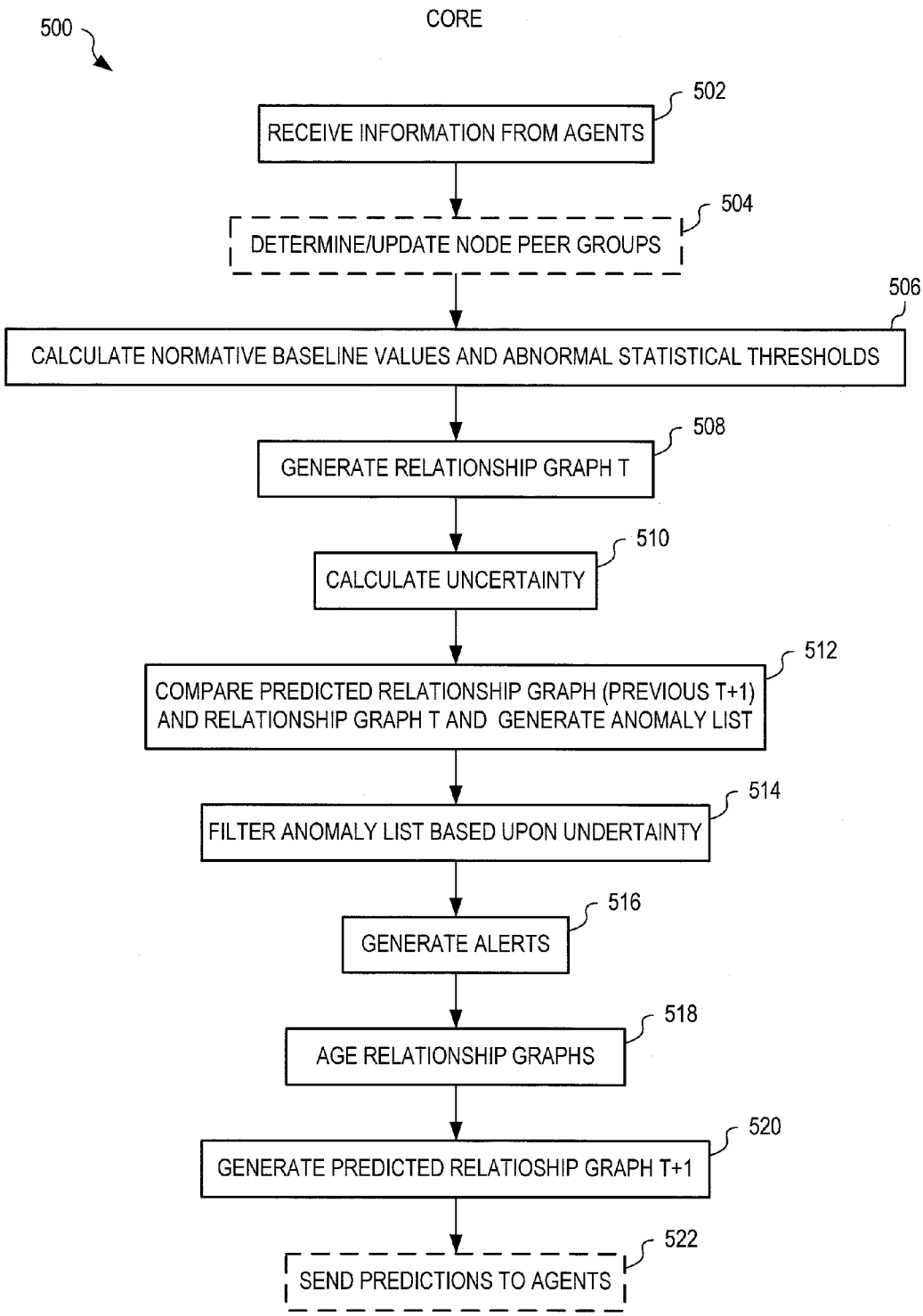
FIG. 5 shows one exemplary method implementing the processing functionality depicted in FIG. 4, in an embodiment.

FIG. 4 shows one exemplary data flow schematic 400 illustrating processing functionality and generated data items within core 110 to generate anomaly alerts. Core 110 is a computer having at least one processor (e.g., a processor core), memory, and at least one interface for communicating with agents 106 (optionally via relay 108). Functionality depicted in FIG. 4 is implemented within analyzer 132, and is further shown in method 500 of FIG. 5. Method 500 is implemented within core 110, for example. FIGS. 4 and 5 are best viewed together with the following description.

In the following description and figures, T indicates a current time of execution of method 500, T+1 indicates a future time of executing method 500, and T−1 indicates a previous time of execution of method 500, and so on. That is, times T−3, T−2, T−1, T, and T+1 represent times of iterative execution of method 500 within core 110.

In step 502, method 500 receives information from agents. In one example of step 502, a data collector 402 within core 110 receives information 120 from agents 106 and determines updates and changes 452 and a sample age 453. Step 504 is optional. If included, in step 504, method 500 determines node peer groups. In one example of step 504, a peer analyzer 408 processes information 120 received by data collector 402 in step 502 to establish peer groups, classifications and baselines 138.

In step 506, method 500 calculates normative baseline values and statistical thresholds. In one example of step 506, a baseline calculator 406 determines normative baseline values and abnormal statistical thresholds 454 and defines a quality of baseline 456.

In step 508, method 500 generates relationship graph T. In one example of step 508, a graph updater 404 updates, based upon updates and changes 452, relationship graph T−1 458 to form relationship graph T 134. In step 510, method 500 calculates uncertainty. In one example of step 510, an uncertainty calculator 412 determines uncertainty 466 based upon quality of baseline 456 and sample age 453. Uncertainty 466 defines the uncertainty of potential anomalies for each node and edge within relationship graph T 134.

In step 512, method 500 compares predictive relationship graph (previous T+1) and current relationship graph T and generates an anomaly list. In one example of step 512, a graph comparator 414 compares, based upon normative baseline values and abnormal statistical thresholds 454, relationship graph T 134 against previous predictive relationship graph T+1 136 and generates a potential anomaly list 468 containing identified differences between graphs 134 and 136 and variations that exceed thresholds 454.

For an alert, relationship graph 134 may be used to identify the two components (nodes) involved (the source of the attack and the target of the attack). The source may not be the ultimate source of the attach, so system 100 may then examine the relationships of the source component with a lower alert threshold to see if any further components (nodes) are implicated, and so on, back to the original source (including leaving the enterprise to identify an inbound source). Once the source within enterprise system 150 is discovered, defense system 100 may then trace relationships forward from the source component to identify any other potentially compromised components.

In step 514, method 500 filters the anomaly list of step 512 to remove uncertain anomalies. In one example of step 514, filter 416, based upon uncertainty 466, wherein potential anomalies within list 468 that are based upon uncertain information, as defined within uncertainty 466, are discarded, resulting in a final anomaly list 470 containing anomalies that are more certainly serious.

In step 516, method 500 generates alerts. In one example of step 516, core 110 outputs final anomaly list 470 as alerts 118.

In step 518, method ages the relationship graphs. In one example of set 518, relationship graph T 134, and other graphs 458, 460, 462, 464, are aged such that graph 462 becomes graph 464, graph 460 becomes graph 462, graph 458 becomes graph 460, and graph 134 becomes graph 458, and so on.

In step 520, method 500 generates predictive relationship graph T+1. In one example of step 520, graph predictor 410 generates predictive relationship graph T+1 136 based upon relationship graph T 134, previous relationship graph T−1 458, and optionally based upon peer group classifications and baseline 138 and previously generated relationship graphs T−2 460, T−3 462, T−4 464, and so on. That is, predictive relationship graph T+1 136 is based upon previously determined connectivity and behavior of enterprise system 150 (i.e., defense system 100 learns expected behavior of enterprise system 150).

Step 522 is optional. If included, in step 522, method 500 sends predictions to agents. In one example of step 522 when included, core 110 sends at least part of predictive relationship graph T+1 136 to each agent 106, wherein each agent 106 may detect certain potentially anomalous behavior and connectivity at the earliest opportunity.

Graphs 134, 136, 458, 460, 462, 464, and so on, are stored, at least in part, within a database 112. Database 112 is for example an Apache Hadoop implementation of a Hadoop Distributed File System (HDFS) that supports map reduce (MR) jobs. Database 112 stores information chronologically, such that a history of the stored data is constructed.

In one embodiment, database 112 stores subgraphs that focus on high-value components 152 of enterprise system 150 may be kept and analyzed in greater detail than the entire network to improve response time, cost, and scalability.

In general, graphs may be stored using three types of structures—each has advantages, and may be used together for different purposes. An adjacency matrix has each node as a row and column entry with the intersection of each row and column representing an edge from the row to the column node. The value stored in the intersection could be a 0, 1 or a weight value, or a data structure to hold more data about an edge. As networks are often sparse, storage costs of adjacency matrices are high, even if they are computationally easy to operate on. An adjacency list replaces the matrix with a linked list entry for each existing edge (reducing storage costs). So node 0 would have a list like node 0 {(node 1, edge 0→1 weight), (node 7, edge 0→7 weight, . . . )}. An incidence list is a preferred structure as it is compact and allows for interesting operations in its own right. In an incidence list, each node is defined as a data structure (containing data such as its unique ID built from the fingerprint of the associated component 152), as each edge (containing data such as the weight). Each node structure contains zero or more pointers to edge structures. This allows the edges to be operated on directly.

Agent Operation

Figure 6:
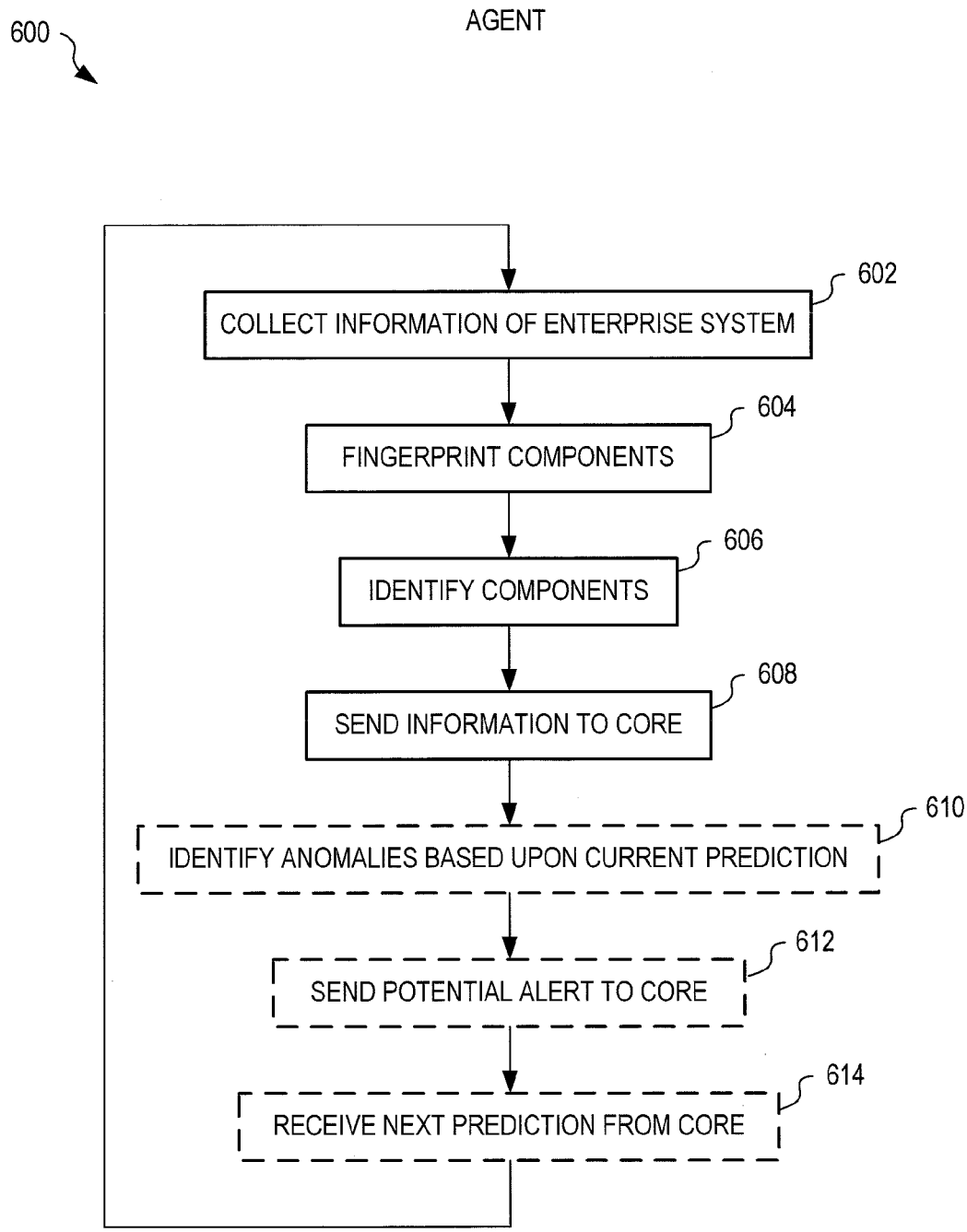
FIG. 6 shows one exemplary method for collecting and sending information of enterprise system core of FIG. 1, in an embodiment.

FIG. 6 shows one exemplary method 600 for collecting and sending information of enterprise system 150 to core 110. Method 600 is implemented within each agent 106, for example.

In step 602, method 600 collects information of the enterprise system. In one example of step 602, agent 106 interrogates components 152 of enterprise system 150 to determine current connectivity and relationships between components 152. In step 604, method 600 fingerprints each component. In one example of step 604, agent 106 generates a fingerprint for endpoint 152(5) that is a hash value of information collected from the endpoint, including its MAC address, its OS type, a browser type, and a hardware configuration.

In step 606, method 600 identifies the components. In one example of step 606, agent 106 compared the fingerprint generated in step 604 to fingerprints of previously identified components stored locally to agent 106. In step 608, method 600 sends the collected information to the core. In one example of step 608, agent 106 sends information 120 to core 110.

Steps 610 through 614 are optional. Steps 610 through 614 are included when agent 106 operates to provide early detection of potential anomalies. If included, in step 610, method 600 identifies anomalies based upon the current prediction received from the core. In one example of step 610, agent 106 compares collected information 120 against prediction 122, received previously from core 110.

If included, in step 612, method 600 sends potential alerts to the core. In one example of step 612, where differences between collected information and predictions are determined, agent 106 generates a potential alert 124 indicating the component and associated parameters that cause the potential alert. For example, where prediction 122 is "expect endpoint 230(2) to connect to database 224 between 23:00 and 00:00, Monday to Friday, for 10 to 15 minutes and to pass 10-20 KB of data in, and receive 20-30 KB of data out", when endpoint 230(2) connects to database 224 outside of the designated times, agent 106 determines that this is an anomaly. Agent 106 may identify potential anomalies when the connection occurs from a different endpoint, if more than one endpoint connects to the database, if the amount of data transferred to or from the database is significantly different than predicted. Upon determining such anomalies, agent 106 generates potential alert 124. Core 110, upon receiving potential alert 124, determines whether the alert passes associated uncertainty thresholds, and if it does, core 110 generates alert 118. For example, a component identified as anomalous may be further investigated. Reverse IP lookup may be used to determine the location of a connected node; however, such information is easily spoofed—although, failure of a reverse IP lookup is, in itself, indicative of anomalous behavior. System 100 may therefore utilize 'traceroute', a known technique in the art, to determine location of a node and further utilize roundtrip latency to cross-check the determined location. The physical location of the node may provide further indication of compromise likelihood.

If included, in step 614, method 600 receives a next prediction from the core. In one example of step 614, agent 106 receives a next prediction 122 from core 110, wherein prediction 122 is used in a subsequence iteration of method 600.

Textual Analysis

Agent 106 operates to collect textual data from components of enterprise system 150. Agent 106 is for example co-resident with the textual data in a component 152, and/or includes a crawler that is able to acquire the textual data from components 152. Agent 106 may collect text from one or more of system logs, security logs, application logs, database logs, process lists, scripts, configuration files, and VM templates.

Figure 7:
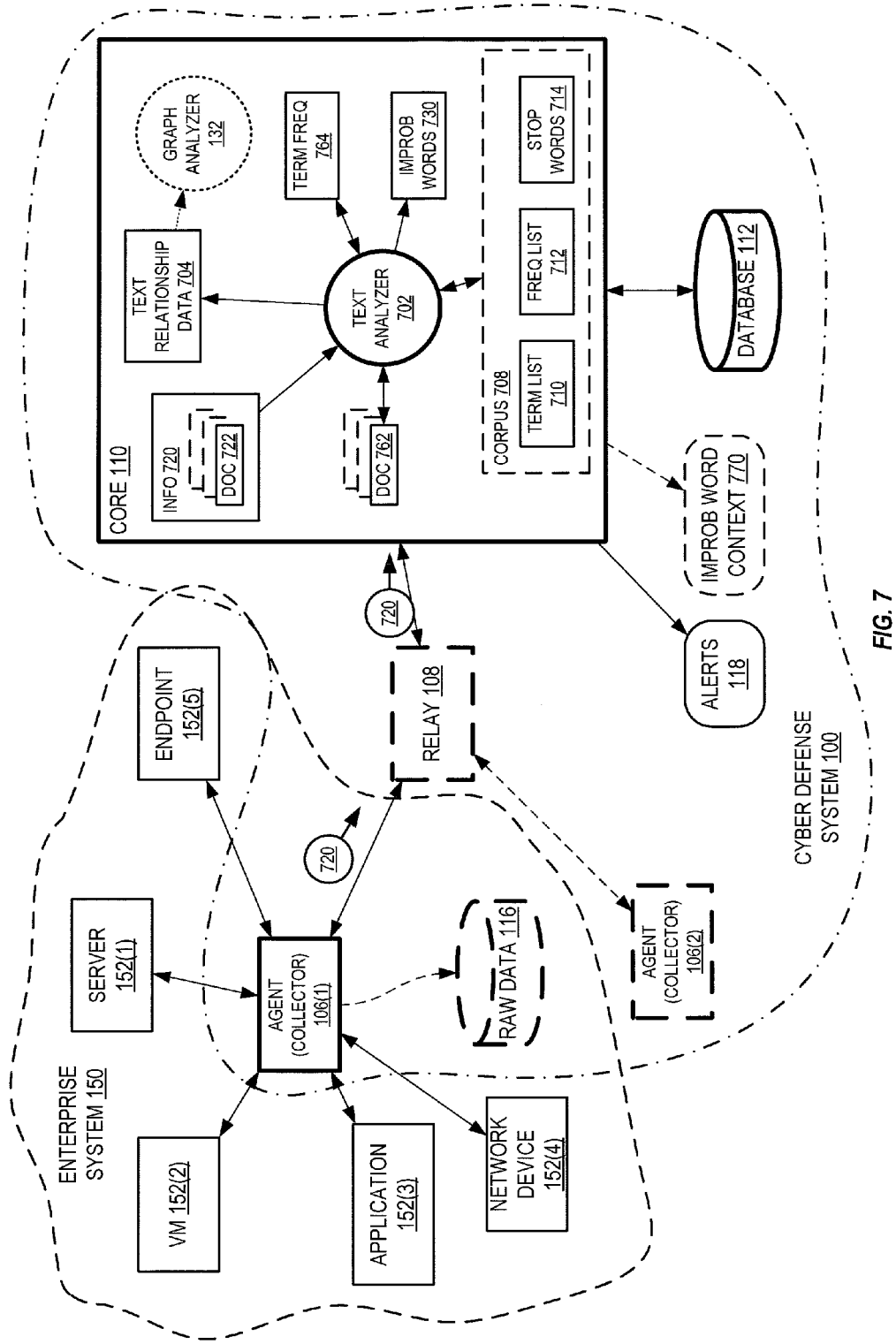
FIG. 7 shows the cyber defense system of FIG. 1 with a textual analyzer operating within the core, in an embodiment.
Figure 8:
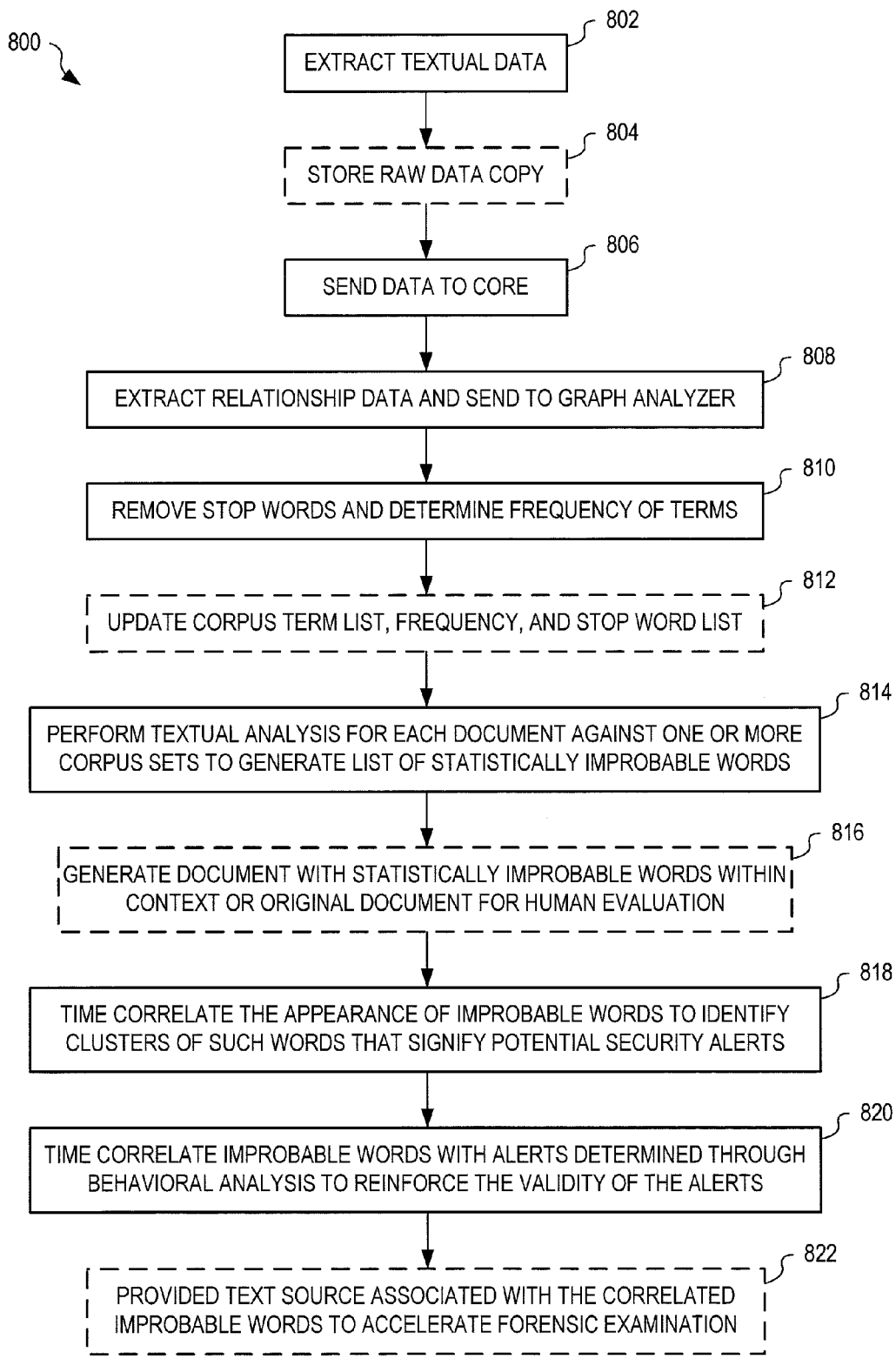
FIG. 8 shows one exemplary method for analyzing text to identify potential anomalies within the enterprise system of FIG. 1, in an embodiment.

FIG. 7 shows cyber defense system 100 with a textual analyzer within core 110. FIG. 8 shows one exemplary method 800 for analyzing text retrieved from enterprise system 150 to identify potential anomalies within the system. FIGS. 7 and 8 are best viewed together with the following description.

In the example of FIGS. 7 and 8, defense system 100 implements term frequency-inverse document frequency (TF-IDF) analysis to generate a list of improbable words. However, other textual analysis methods may be used without departing from the scope hereof. For example, defense system 100 may implement latent sematic analysis (LSA) to generate improbable words from text retrieved from enterprise system 150.

Steps 802 through 806 of method 800 are for example implemented within agent 106 of FIG. 1. Steps 808 through 818 of method 800 are implemented for example within a text analyzer 702 operating within core 110.

In step 802, method 800 extracts textual data from components of the enterprise system. In one example of step 802, agent 106 collects documents, scripts, logs, and other textual files and summaries (hereinafter referred to as documents 722), from components 152 of enterprise system 150. Optionally, agent 106 may enrich the documents 722 within information 720, where appropriate by adding metadata, such as timestamps, corpus classification, and data source information. Step 804 is optional. If included, in step 804, method 800 stores a copy of the raw collected data (e.g., documents 722) locally for later processing and/or reference. In one example of step 804, agent 106 stores a copy of documents 722 in database 116. In step 806, method 800 sends the collected data to the core. In one example of step 806, agent 106 sends information 720, including documents 722, to core 110, optionally via relay 108 if included and needed.

In step 808, relationship data is extracted from the received information and sent to the graph analyzer. In one example of step 808, text analyzer 702 extracts, from documents 722 of information 720, text relationship data 704 for further processing by graph analyzer 132. In step 810, method 800 removes stop words from text and determine frequency of terms. In one example of step 810, text analyzer 702 removes stop words 714 from each document 722 of information 720, based upon one or more corpus 708 associated with the document, to form documents 762 and then determines the frequency of each remaining term within each document 762.

Step 812 is optional. If included, in step 812, method 800 updates the associated corpus term lists, frequency of terms, and stop word list for each document. In one example of step 812, text analyzer 702 updates term list 710, frequency list 712, and stop word list 714 of corpus 708 based upon determined frequency of terms in step 810. Frequency of a given term in a particular document is compared to the same term's frequency over the whole corpus. Where the frequency in a given document is statistically very different from the frequency of that term in the corpus, an "unusual" occurrence is identified.

In step 814, method 800 performs textual analysis for each document against one of more corpus sets to generate a list of "statistically improbable" words.

Step 816 is optional. If included, in step 816, method 800 generates a document with statistically improbably words of step 814 within the context of the original document for human examination. In one example of step 816, text analyzer 702 generates an improbable work context document 770 containing each word of improbable words 730 together with surrounding words from documents 722 for context. An administrator may thereby quickly evaluate each word within improbably words 730 to identify and/or confirm a possible threat to enterprise system 150.

In step 818, method 800 time-correlates the appearance of improbable words to identify clusters of such words that signifies a potential security alert. In one example of step 818, text analyzer 702 groups improbable words 730 based upon associated timestamps to identify groups of words that first appear at a similar time and are greater in number than a defined threshold, such groups indicating a potential alert.

In step 820, method 800 time correlates improbably words with alerts determined through behavior analysis to reinforce the validity of the events. In one example of step 820, text analyzer 702 correlates, based upon time, improbable words 730 with alerts 118 wherein high correlation indicates reduced uncertainty that the alert is valid. Step 822 is optional. If included, step 822 provides, to one or more administrators, text source associated with the correlated improbable words to accelerate forensic examination of the intrusion into enterprise system 150. Given detection of a potentially anomalous behavior, a time window may be defined ahead of and behind the precipitating change. The document sets from the nodes implicated in the anomalous behavior may then be examined for unlikely words or phrases (process names, log files, scripts running on the node). If they exist, this increases the likelihood that a true problem has been identified, and the unlikely words themselves may provide evidence as to the attack and its source.

Corpus 708 may represent a plurality of corpus based upon types of document 722. For example, one corpus 708 may be created and used for one or more of: each type of document (syslog files, python scripts), each source of document (server, endpoint), both type and source of document, the entire enterprise system, and inter-enterprise systems (by type and/or source).

Improbable words may identify script commands that are not commonly used on a particular device, processes that do not normally run on a particular type of device, and so forth.

BEHAVIORAL ANALYSIS EXAMPLES

Example 1

An administrator endpoint 230(2) connects to database 224 each evening for a given duration of time, and transfers a given amount of data to the database, and extracts a given amount of data from the database. This happens over several weeks. System 100 learns this behavior (i.e., records the effects of this behavior within relationship graph 134 over time) and generates a predictive relationship graph 136 predicting that this behavior will occur again the following evening, and will happen within the same rough parameters (e.g., as defined within normative baseline 454) as has happened before. Core 110 generates prediction 122 (e.g., "expect endpoint 230(2) to connect to database 224 within this time window for this duration and to pass this much data in, and this much data out") and sends it to the appropriate agent 106. Agent 106 generates potential alert 124 when determining that prediction 122 (a) doesn't happen at all, (b) happens from a different endpoint, (c) more than one endpoint connects to database 224, (d) if the amount of data transferred to or from database 224 is significantly different than predicted. Within core 110, analyzer 132 determines whether potential alert 124 is high enough to pass the uncertainty threshold to generate an actual alert 118. An alert condition is heightened by factors such as: (a) independent correlation by an anomaly from the text analysis system, (b) the value of data stored in the database (e.g., credit card information), (c) the amount of data extracted from the database as compared to the amount of data extracted during previous connections, and (d) differences identified with the endpoint (e.g., the fingerprint of the endpoint does not match fingerprints of devices used by the administrator making the connection).

Uncertainty is a function of the age of the data used in the prediction (the older the data, the less likely the prediction is valid), and the amount of data used to establish normative baseline 454 (i.e., whether there is sufficient data to make statistically valid predictions). Different predictions may require different amounts of data. For example, duration of a connection may require less historical data than the amount of data transferred. The normative baseline 454 is established by examining how endpoint 230(2) connects to database 224 over time and, optionally, by examining how other statistically similar endpoints (peer group components) connect to other statistically similar databases over time.

No two connection events are expected to be identical (for example, they won't occur at exactly the same time), and therefore a connection event is predicted (e.g., defined within predictions 122) based upon statistical data of previous events. An anomaly is identified when a connection event occurs statistically outside (e.g., two sigma outside of the mean) the normative baseline of the predicted connection event. If the alert level of the identified anomaly is above an uncertainty threshold for that type of anomaly, core 110 enters a response phase. In one example of operation, core 110 and/or agent 106 disconnects endpoint 230(2), if still connected. In another example of operation, a user (e.g., the assumed administrator) of endpoint 230(2) is asked to enter an additional PIN on a separate endpoint (e.g., the mobile phone identified with the administrator) to prove the identity of the user of endpoint 230(2). In another example of operation, a tracer payload is added to the data being uploaded by endpoint 230(2). In each case, security personnel may be notified and asked to respond.

This exemplary model may be applied to all of the connections made to the database, not just endpoints (representing users). For example, this model may also be applied to applications (e.g., application 222).

Example 2

Relationship graph 134 forms a historical record of all relationships established by a given endpoint, and includes components that the endpoint connects to (e.g., the CRM system, the email system, the HR system) and also defines (a) an order in which the endpoint connected to each of these components, (b) a duration of each connection, and (c) how much data typically traverses in each direction of the connection. From this historical data, and optionally from historical data of statistically similar endpoints, defense system 100 determines normative baseline 454. Any change in the historical pattern of connection and behavior is identified as a potential anomaly. Defense system 100 predicts, for example, that each endpoint will access previously accessed components within enterprise system 150 in a similar order, for a similar duration, and transfer similar amounts of data as previously recorded.

Certain behavior may be reduced in importance (e.g., the recorded behavior pattern may not repeat on weekends or holidays, may change at end of month or end of quarter or end of year). However, within defense system 100, the following departures from expected behavior changes are considered of key importance: a first component accessing a second sensitive component that is not typically accessed by the first component, a first component accessing a second sensitive component for a much longer duration than previously done, and a first component extracting much more data from a second component than previously done. Other behaviors that correspond to attack vectors include: a component sending email with attachments or links to external URLs to large numbers of people, or to people who have access to sensitive components of enterprise system 150. Defense system 100 may also identify a potential anomaly when the same endpoint is identified twice in relationship graph 134, since this indicates that a third party has spoofed a valid endpoint and is operating within enterprise system 150 as that endpoint.

In one example of operation, defense system 100 first gathers all possible information from all possible sources within enterprise system 150. The gathered information is mostly textual that is also directly used by text analyzer 702, thereby defense system 100 handles graph analysis, text analysis, and peer group classification in one data flow. The collected information (e.g., information 120) is pulled into a Map Reduce (MR) framework. The MR jobs decompose the data into a series of relationships, each of which is an edge update to a node of the graph. The resulting relationship updates are then applied to a datastore (such as HBase) via MR. This allows a very high volume of updates to be applied without any centralized locking or storage, as each update is a straight write without any preceding reads. The state of the graph node (or HBase row) is a superposition of each of the updates applied at read time. This allows for a very scalable processing model. Besides allowing for applying many updates in parallel in a distributed fashion, this also allows for efficient processing for many graph theory-based algorithms, such as models based on Markov chains.

With respect to the graph analysis algorithms, the preferred approach is using a Markov chain model for finding repeatable patterns for sub-trees based on the relationship/node types, then detecting anomalies to those patterns.

Example 3

Figure 9:
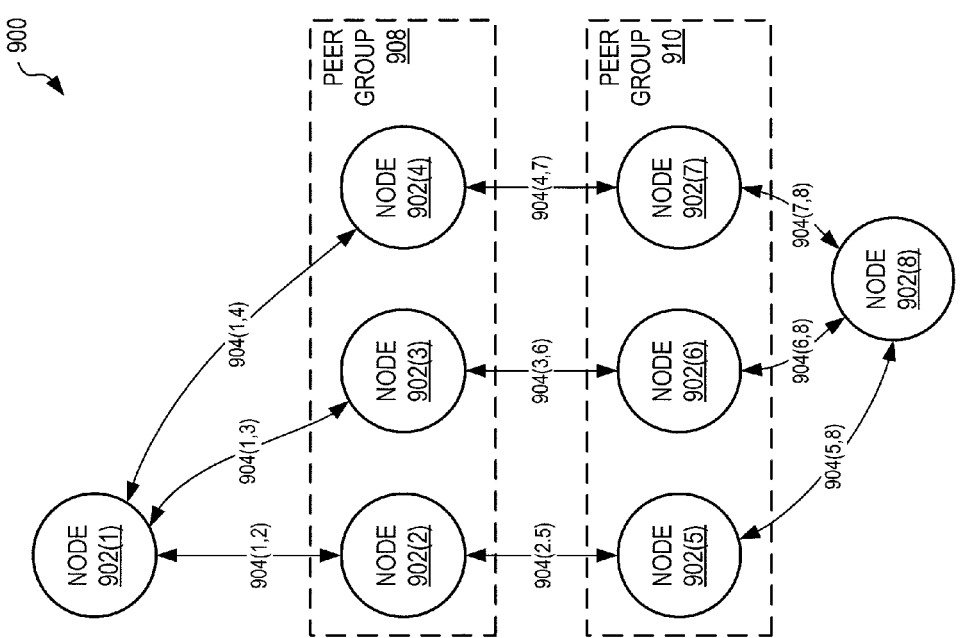
FIG. 9 shows one exemplary subgraph of the relationship graph of FIG. 1 illustrating eight nodes and nine edges, in an embodiment.

FIG. 9 shows one exemplary subgraph 900 of relationship graph 134 illustrating eight nodes 902 and nine edges 904. Node 902(1) represents an endpoint component that is used by an administrator. Nodes 902(2)-(4) represents connectivity components that each provide connectivity to one of three second connectivity components represents by nodes 902(5)-(7), respectively. Components associated with nodes 902(2)-(4) are similar to each other and have similar behavior, and are therefore defense system 100 identifies these nodes as being within a peer group 908. Similarly, components associated with nodes 902(5)-(7) are similar to one another and have similar behavior, and are therefore defense system 100 identifies these nodes as being within a peer group 910. Node 902(8) represents a high value database component within enterprise system 150 (e.g., database 224). As shown, node 902(1) connects with each of nodes 902(2)-(4).

Node 902(1) is shown connected to node 902(8) using three independent paths via nodes 902(2) and 902(5), nodes 902(3) and 902(6) and nodes 902(4) and 902(7), and represents an administrator using the endpoint associated with node 902(1) to administer the database associated with node 902(8).

Figure 10:
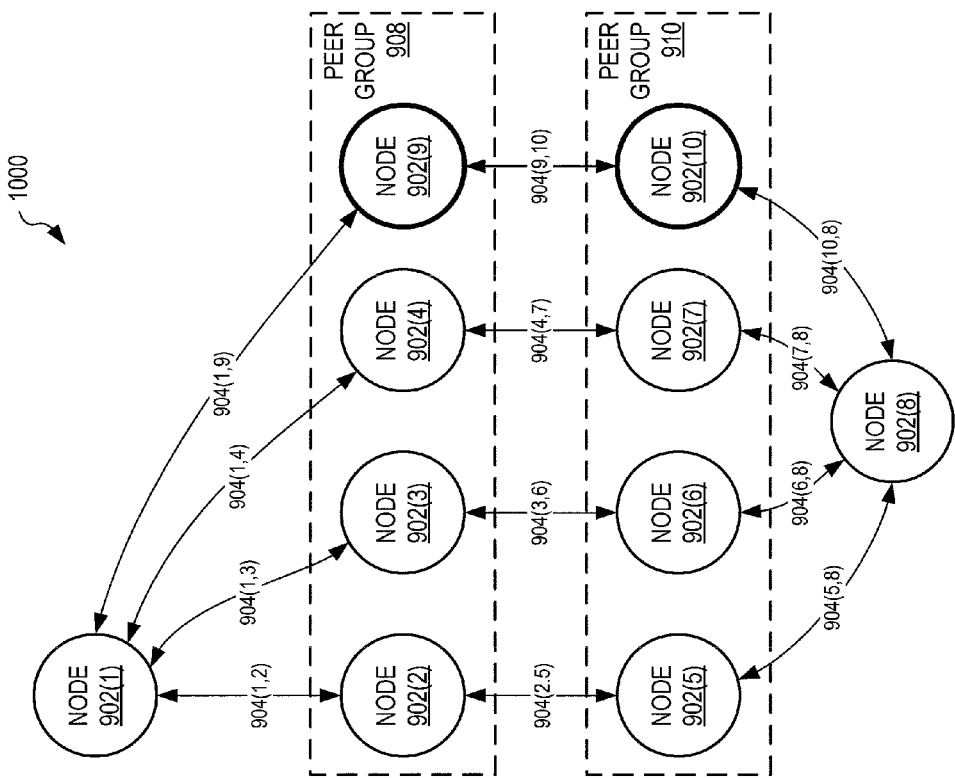
FIG. 10 shows an exemplary subgraph of the relationship graph of FIG. 1 illustrating the eight nodes and nine edges shown in the subgraph of FIG. 9, with two additional nodes and three additional edges, in an embodiment.

FIG. 10 shows an exemplary subgraph 1000 of relationship graph 134 illustrating the eight nodes 902 and nine edges 904, as shown in subgraph 900 of FIG. 9, with two additional nodes 902(9) and 902(10) representing components that have been added to enterprise system 150, since the capture of subgraph 900, to provide additional access to database 224 for example. The component associated with node 902(9) is similar to components associated with nodes 902(2)-(4), and is therefore included within peer group 908. Similarly, the component associated with node 902(10) is similar to components associated with nodes 902(5)-(7) and is therefore include within peer group 910.

Edges 904(1,9), 904(9,10), and 904(10,8) represent a data path used by the administrator to access database 224 that has previously not been used. However, based upon peer groups 908 and 910, defense system 100 predicts that the administrator may access database 224 via components associated with nodes 902(9) and (10), and therefore no anomaly is identified, provided that the administrator behaves similarly to when accessing database 224 via the other data paths.

Compliance Enforcement

Cyber defense system 100 directly addresses the problem of compliance enforcement. Cyber defense system 100 gathers information of enterprise system 150 and then infers the behavior patterns of users and devices in the system: who is accessing what data, for how long, and from where. Cyber defense system 100 may either "discover" what is normal behavior for a monitored high-risk system (such as a database), be instructed as to what behaviors are allowed (the policy), or a combination of both. When behavior occurs that is outside "normal" or "compliant", alerts may be raised and automatic responses taken. If a well-intentioned employee is accessing a protected system from home over VPN, for example, cyber defense system 100 flags an alert, and may direct the VPN component to terminate the connection. If a user endpoint is extracting volumes of data well beyond what is considered normal for the connected datastore, alerts may be raised, the connection terminated, and the endpoint itself may be disconnected before the data is forwarded.

As part of the behavior analysis process, cyber defense system 100 also collects and analyzes text data from the monitored systems, including items such as database logs, security logs, scripts, and running programs. When an anomaly is discovered that may represent a compliance violation, appropriate text items may be correlated to the anomaly, providing responders with a complete forensic trail at the outset.

Business Process Optimization

Modern enterprise systems are shifting to a service-oriented model of application provisioning. Loosely-coupled, virtualized, atomic services tied into infrastructure elements, such as user provisioning and identity management, provide a replacement to the monolithic application silos that have previously dominated the enterprise landscape. This service-oriented model approach provides powerful flexibility—services may be introduced, expanded, decommissioned, upgraded, and shifted to the Cloud without severely impacting operation of the rest of the enterprise system.

However, this flexibility comes at a cost. Management tools that provided insights for availability, security, capacity planning, and optimization of resources purposes were designed for the monolithic world of the past. With the advent of virtualization, management and monitoring tools operating at the IP layer no longer directly correspond to what is happening at the application layer above, and so cannot provide actionable insights. The introduction of greater virtualization (including network virtualization), greater service-orientation, and more use of Cloud infrastructure mean that these problems will only be exacerbated.

A modern enterprise system embracing the current trends in application provisioning and deployment simply has no idea how those applications are being utilized in a holistic way.

Cyber defense system 100 is designed to monitor behavior of enterprise system 150 to determine, and analyze anomalies such as policy violations and threats, such as Malware attacks. However, to do so, defense system 100 analyzes the behavior of enterprise system 150 at a user-application-service layer to determine normal behavior. By collecting this behavior data, representing patterns of service use by users over time, defense system 100 directly addresses the gap that has opened up for the modern enterprise systems.

Non-Security Use of Graphs

The technique of analyzing user behavior via relationship graphs may be applied to uses beyond security. By focusing the relationship graph on the application layer (versus the IP layer)—specifically, the relationships between applications, data stores and peer groups of users (as represented by endpoints)—we can derive a map of the actual business process flows in the enterprise showing load, time, ordering and much more. In a modern enterprise, systems are loosely coupled and provided as stand-alone services, making it difficult to monitor activity across multiple applications (most monitoring is focused on monitoring the top to bottom silo of one application). This data can then be used to optimize the process, the IT infrastructure, and identify non-security anomalies.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A cyber defense method for protecting an enterprise system having a plurality of networked components, at least some of the components being accessible via endpoints, comprising:

collecting connectivity and relationship information indicative of connectivity and behavior of the components resulting from human interaction with the endpoints;

creating a relationship graph based upon the connectivity data and the relationship data, wherein nodes of the relationship graph represent the components and edges of the graph represent connectivity and relationships between the components;

storing at least part of the relationship graph to form a chronology indicating the connectivity and relationship information of the components at a given time;

generating a prediction by analyzing the previously stored relationship graph and the previously formed chronology, the prediction indicating expected future connectivity and relationship behavior within the enterprise system; and identifying a first anomaly when the most recent connectivity and relationships do not match the prediction.

2. The cyber defense method of claim 1, further comprising analyzing the relationship graph to identify peer groups of nodes that have similar connectivity and relationship characteristics, wherein the prediction is further based upon the peer groups.

3. The cyber defense method of claim 1, further comprising sending at least part of the prediction to an associated agent operating to collect the connectivity and relationship information, wherein the agent identifies the first anomaly.

4. The cyber defense method of claim 1, further comprising:
   determining uncertainty of the connectivity or relationship information; and
   generating an alert if the uncertainty is less than a predefined threshold.

5. The cyber defense method of claim 1, further comprising:
   collecting textual data from at least a portion of the components;
   processing the textual data to identify infrequent phrases or words; and
   identifying a second anomaly based upon the infrequent words or phrases.

6. The cyber defense method of claim 5, further comprising generating the alert based upon correlation of the first and second anomaly.

7. The cyber defense method of claim 5, the infrequent phrases or words identifying script commands that are not commonly used on a corresponding one of the portion of the components.

8. The cyber defense method of claim 5, the infrequent phrases or words identifying processes that are not commonly run on a corresponding one of the portion of the components.

9. A cyber defense method for protecting an enterprise system having a plurality of networked components, comprising:
   receiving information indicative of human interaction with endpoints of the enterprise system from at least one agent configured to collect the information from the enterprise system;
   calculating normative baseline values and abnormal statistical thresholds based upon the information;
   generate relationship graph T based upon updates and changes within the information;
   calculate uncertainty based upon the information and an age of the information;
   compare a previously generated predicted relationship graph T and relationship graph T and generate anomaly list;
   filter anomaly list based upon uncertainty; and
   generating alerts based upon the filtered anomaly list.

10. The cyber defense method of claim 9, further comprising aging the relationship graphs.

11. The cyber defense method of claim 9, further comprising generating the predicted relationship graph based upon the relationship graphs.

12. The cyber defense method of claim 11, further comprising sending predictions within the predicted relationship graph to the at least one agent, wherein the agent identifies current events within the enterprise system not matching the predictions.

13. A software product comprising instructions, stored on non-transitory computer-readable media, wherein the instructions, when executed by a computer, perform steps for protecting an enterprise system having a plurality of networked components, comprising:
   instructions for collecting connectivity and relationship information indicative of connectivity and behavior of the components resulting from human interaction with endpoints of the enterprise system;
   instructions for creating a relationship graph based upon the connectivity data and the relationship data, wherein nodes of the relationship graph represent the components and edges of the graph represent connectivity and relationships between the components;
   instructions for storing at least part of the relationship graph to form a chronology;
   instructions for generating a prediction by analyzing the previously stored relationship graph and the previously formed chronology, the prediction indicating expected future connectivity and relationship behavior within the enterprise system; and
   instructions for identifying a first anomaly when the most recent connectivity and relationships do not match the prediction.

14. The software product of claim 13, further comprising instructions for analyzing the relationship graph to identify peer groups of nodes that have similar connectivity and relationship characteristics, wherein the prediction is further based upon the peer groups.

15. The software product of claim 13, further comprising instructions for sending at least part of the prediction to an associated agent operating to collect the connectivity and relationship information, wherein the agent identifies the first anomaly.

16. The software product of claim 13, further comprising:
   instructions for determining uncertainty of the connectivity and relationship information; and
   instructions for generating an alert if the uncertainty is less than a predefined threshold.

17. The software product of claim 13, further comprising:
   instructions for collecting textual data from at least a portion of the components;
   instructions for processing the textual data to identify infrequent phrases or words; and
   instructions for identifying a second anomaly based upon the infrequent words or phrases.

18. The software product of claim 17, further comprising instructions for generating the alert based upon correlation of the first and second anomaly.

19. The software product of claim 17, the infrequent phrases or words identifying script commands that are not commonly used on a corresponding one of the portion of the components.

20. The software product of claim 17, the infrequent phrases or words identifying processes that are not commonly run on a corresponding one of the portion of the components.

* * * * *